UNITED STATES PATENT OFFICE.

LUCIEN LINDEN, OF BRUSSELS, BELGIUM.

OXIDIZING PROCESS.

1,094,731.　　　　　Specification of Letters Patent.　　Patented Apr. 28, 1914.

No Drawing.　　　Application filed June 6, 1911.　Serial No. 631,622.

*To all whom it may concern:*

Be it known that I, LUCIEN LINDEN, a subject of the King of the Belgians, residing at 117 Rue Belliard, Brussels, Belgium, have invented a new and useful Oxidizing Process; and I do hereby declare the following to be a full, clear, and exact description of the same.

The present invention relates to an oxidizing process for the destruction or modification of any dead or living organic substances and is especially suitable for the sterilization and purification of water.

The process consists essentially therein that when commencing the purification a soluble permanganate and a ferric salt are introduced at the same time and at the same place and after these reagents have produced their effect, the liquid is aerated, after which a soluble hypochlorite is added to it.

Processes have become known, in which it was proposed to add to water to be purified, first permanganate and later ferric salts, but in such case the excess permanganate was decomposed. In the present invention, however, the permanganate and ferric salt are thus introduced at the same time and at the same place that, with the coöperation of the oxygen in the air, the manganate formed during the process is oxidized again into permanganate so that the required quantity of permanganate is reduced to the least possible. The hypochlorite added later on serves principally as a precipitating means so as to separate the iron or manganese that might perhaps remain in order that it may produce a good effect. The duration of the action of the reagents upon the water, should be long enough to permit of the oxidation of the organic substances accessible to the permanganate and other oxygen conveyers employed. The sufficiency of reaction will be shown by the greenish color assumed by the mass of water. Then a suitable mass of a hypochlorite (sodium or calcium) is added thereto. The hypochlorite sets free the hypochloric acid and hence assists the conversion of the manganates into permanganates. On the other hand the hypochlorite prevents the presence of metallic impurities (Fe Mn or analogous substances) in solution in the purified water, because it precipitates the same in the insoluble state. Taken all together the reactions which occur serve to revive constantly the employed oxidation means and to obtain a maximum oxidation at a minimum cost. An excess permanganate is neither useful nor necessary. On the contrary a few grams of permanganate are sufficient to produce excellent results. Usually, for very impure water about 10% of the theoretical quantity required, is used to reduce the organic substances in the water or about 20% of the quantity for reducing the organic substances in the water which has simply been treated with lime. Ferric chlorid or ferric sulfate is added in quantities of about 2 grams per cubic meter, according to the condition of the solution.

The process is put in practice as follows: Preferably the water having first been treated with lime, a solution is added thereto which consists of a combination of a permanganate, for instance a permanganate of potassium, sodium or calcium, and ferric chlorid or ferric sulfate or other individual or compound ferric salt which contains highly oxidized iron, provided always that the most acid thereof cannot affect the permanganate. If permanganate were introduced alone, the excess of lime, in the presence of the organic substances would affect part of the permanganate converting the same into double manganate of potassium or calcium. This would cause a loss of permanganate which is avoided by the addition of ferric salts. By an addition of a ferric salt to permanganate the following reaction takes place:

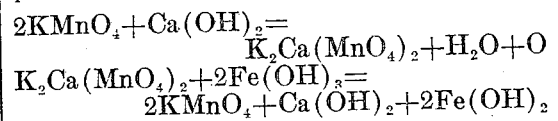

By contact with the air and dissolved oxygen, $Fe(OH)_2$ is converted into $Fe(OH)_3$ which allows of the used ferric hydrate to be utilized again during a certain time depending upon the alkaline strength of the medium. The addition of a ferric salt in any manner, provided of course its acid does not act in such a manner as to increase the sensitiveness of the permanganate, requires as has been stated before an addition of oxygen from the outside of the water.

I claim as my invention:

A process of oxidation for the destruction and modification of organic substances, especially intended for the sterilization and purification of water, wherein a soluble permanganate of a non-poisonous substance and a ferric salt of a non-poisonous substance are used, said process consisting in introducing the permanganate and a ferric salt simultaneously and at the same place into the water which has previously been made alkaline; and afterward, when these elements have acted long enough, which is shown by the coloring green of the water, aerating the water; and thereafter adding a soluble hypochlorite of a non-poisonous substance.

In testimony whereof I have signed my name to this specification in the presence of two subscribing witnesses.

LUCIEN LINDEN.

Witnesses:
M. GLERBEAULO,
RENI P. WITTEBOLLE.